United States Patent Office 3,759,869
Patented Sept. 18, 1973

3,759,869
SILANE SUBSTITUTED POLYDIENES
Irving Skeist, Summit, and Jerry Miron, Livingston, N.J., Murray Steinfink, Monsey, N.Y., Manilal Savla, Parsippany, and Joseph Robles, Newark, N.J., and Pradip Bhatt, Northborough, Mass., assignors to Skeist Laboratories, Inc., Livingston, N.J.
No Drawing. Filed Sept. 14, 1971, Ser. No. 181,611
Int. Cl. C08d 9/10
U.S. Cl. 260—41.5 R
13 Claims

ABSTRACT OF THE DISCLOSURE

A polymeric composition which can be used to enhance the strength of bonding in filled and reinforced polymer products, as well as enhance the bonding strength of conventional adhesives is disclosed. The polymeric composition is comprised of the following groups:

, $Y_m$ and $W_p$ where W is an end group and p is at least 2, $Y_m$ is a divalent radical which may be alkylene, alkenylene and arylalkylene, X is a halogen, an alkoxy radical or an acyloxy radical, R is an alkylidene radical which may be substituted. o is zero or an integer from 2–5, and n and m are chosen so that the molecular weight is at least about 500 to about 50,000 so long as n is never less than 1.

---

This invention relates to new composition of matter, and processes for producing said new compositions of matter. More particularly this invention relates to a polymeric composition of matter containing silane-modified polydienes, copolymers of silane-modified polydienes, and processes for producing said polymers.

It is an object of this invention to provide a new polymer composition.

It is another object of this invention to provide a new polymer composition which will enhance the strength of reinforced or filled polymers.

It is another object of this invention to provide a process for preparing more compatible filler materials for reinforced polymer products.

It is another object to provide a process for preparing said new polymer compositions.

It is another object of this invention to provide new polymer compositions which when coated upon solid structures will enhance bonding strength of conventional adhesives.

The polymer compositions of this invention are comprised of groups which may be characterized by the following general formulae:

; $Y_m$ and $W_p$

This group may be arranged in random order except that W is always an end group.

In the above formula R is a trivalent alkylene radical containing from two to ten carbon atoms or a substituted trivalent alkylene radical with substituents selected from the group consisting of a hydroxyl radical, a carboxyl radical and an amine radical. X in the above formula is a halide atom having a molecular weight less than 127, an acyloxy radical containing from two to five carbon atoms, or an alkoxy radical containing from one to five carbon atoms. The letter Y in the above formula represents an alkylene radical containing from two to ten carbon atoms, a hydroxy phenylalkylene radical containing eight to fourteen carbon atoms, a hydroxy phenylalkylene radical containing from eight to fourteen carbon atoms, a hydroxy phenylalkylene radical containing from eight to fourteen carbon atoms, a hydroxy alkylphenylalkylene radical containing nine to eighteen carbon atoms, a methoxy phenylalkylene radical containing from nine to fifteen carbon atoms or an ethoxy phenylalkylene radical containing from ten to sixteen carbon atoms, a hydroxy alkylene radical containing from two to ten carbon atoms; or a divalent radical represented by the formula:

$$-CH_2-CH-Z$$
        | wherein Z is a carboxyl radical containing from one to three carbon atoms or a cyanide radical. The letter W represents a hydrogen atom, a hydroxyl radical, carboxyl radical, an amine radical or an epoxy radical. In the above formula n is an integer equal to or greater than one. m is zero or an integer equal to or greater than one, o is zero or an integer from two to five; p is an integer which is at least two, and the sum of m and n are chosen so that the average molecular weight of the polymer characterized by the above formula is from about 500.00 to about 50,000.00.

Examples of radicals which are within the group of R radicals can be represented by the following formula:

(a) 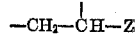

(b) 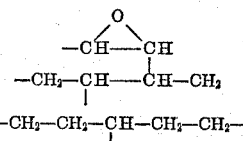

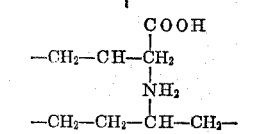

Examples of the radicals which are included in the Y radical represented above include:

phenyl ethylene, 3 hydroxy butylene; 5 amino heptamethylene, hexamethylene; butylene; butenylene; the divalent radical formed by opening the double bond of acrylonitrile and of acrylic acid; ortho methyl phenyl ethylene; parahydroxymethylphenyl ethylene, meta-ethoxyphenyl ethylene; 4 amino iso-octylene; and 4 carboxy, 6 amino decylene.

The polymer compositions of this invention may be characterized by the formula:

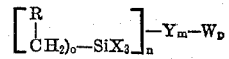

where the symbols, R, Y, W o, m, n, p and X are defined. The chain represented by this formula may be linear, or chained and each group may appear multiple times in random order.

More specific examples of the radical X include, chlorine, iodine, fluorine, bromine, methoxy, propoxy, pentoxy and acetoxy.

In a group of polymers according to the above formula R is the radical $$-CH_2-CH-$$
         |

In a class of polymers within the general formula indicated above Y is chosen from the group of radicals which may be represented by the following formulae:

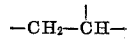

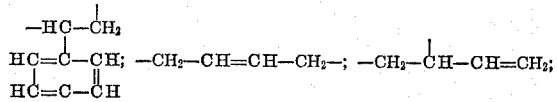

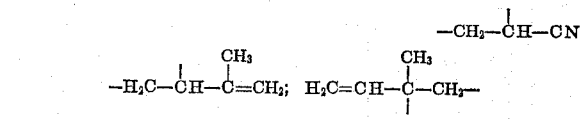

and X is a chlorine, methoxy or ethoxy radical.

In the foregoing formula although $n$ may never be less than one, usually it will be chosen so that at least 5 weight percent of the final polymer can be represented by the group

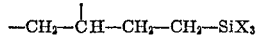

In a preferred class of polymer compositions according to the above general formula R is the radical

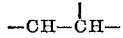

and Y may be represented by the radical

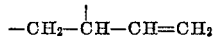

wherein $n$ and $m$ are chosen so that at least 25 weight percent of said polymer consists of a radical which can be represented by the following formula:

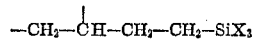

The average molecular weight of these polymers will vary from about 500 to about 10,000.

In general the compositions represented by the above generalized formula are prepared by reacting a polymer containing pendant vinyl groups in the presence of a catalyst with a silane halide, where the halogen has a molecular weight of less than 127. The ratio of moles of trihalosilane per pendant vinyl group will vary from one mole to .01 mole of trihalosilane. Trichlorosilane is preferred.

The catalysts used in preparing the silane modified polymer are generally platinic halides or complexes such as platinic chloride, platinic bromide, platinic carbonate, and platinic methoxy, hydroxy sulphate, and nitrate complexes.

As illustrated in the embodiments of this invention, shown as Examples 1 through 4, the catalyst concentration may be as low as 0.5 weight percent and as high as 1.0 weight percent based upon the weight of the reactants.

This reaction usually takes place at atmospheric pressure and temperatures from about 20 to 70 degrees centigrade. After the reaction is completed, which may take from a few minutes to a few days depending upon the temperature and pressure, the reaction product is usually subjected to a vacuum as low as seven millimeters mercury absolute pressure and a temperature of from 25 to 100 degrees centigrade to remove any unreacted silane reactant. Depending upon the ratio of silane reactant to pendant vinyl groups, the number of silane modified vinyl groups will vary from less than one modified group per molecular chain to complete reaction with all vinyl groups in the chain.

The trihalosilane substituted polymers are then further modified by substituting alkoxy or acyloxy groups for all or a portion of the halogen atoms. This substitution may be made in many ways including reacting the polymer compositions with an orthoalkylformate, with an alcohol or with the alkali metal salt of an organic acid. The specific route of substitution is immaterial so long as an alkoxy group is substituted for a halogen atom. Examples of alkylorthoformates include trimethylorthoformate, tripropylorthoformate, and tripentylorthoformate. Examples of alcohols are propanol, methanol, isobutanol, pentanol, and isopentanol. Examples of alkali metal salts of organic acids include, sodium acetate, lithium propionate, and potassium valerate.

To more particularly point out the process of preparing the polymer compositions of this invention, the following nonlimiting examples are given:

EXAMPLE 1

Five hundred grams of polybutadiene with an average molecular weight of 1000 containing 90% pendant vinyl groups is added to a reaction vessel and subjected to a vacuum of 7 millimeters mercury absolute pressure to dry it. To this polybutadiene is then added 0.5 weight percent of platinic chloride, which is dissolved in acetone, based upon the total weight of polybutadiene, and 700 grams of trichlorosilane. The reaction is allowed to proceed at atmospheric pressure and room temperature (about 25 degrees centigrade) for 80 minutes. At the end of this time the reaction product is subjected to a vacuum of 7 millimeters absolute pressure and heated to a temperature of approximately 60 degrees centigrade until all trisilane chloride is removed. The reaction product is then cooled and found to contain essentially 100% of trichlorosilane added.

EXAMPLE 2

Five hundred grams of polybutadiene containing 90% pendant vinyl groups with an average molecular weight of 1000 is added to a reaction vessel and subjected to a vacuum of 7 millimeters absolute pressure. To this vacuum-dried polybutadiene is then added 0.5 weight percent of platinic chloride based upon the total weight of polybutadiene (the platinic chloride is added dissolved in acetone) and 1000 grams of trichlorosilane. The reaction is allowed to proceed at atmospheric pressure and room temperature (about 25 degrees centigrade) for 80 minutes. At the end of this time the reaction product is subjected to a vacuum of 7 millimeters absolute pressure and heated to a temperature of approximately 60 degrees centigrade until all excess reactants are removed. The reaction product is then cooled and found to be completely saturated, by infrared analysis, indicating addition of trichlorosilane to all unsaturation present in the polymer both pendant and unsaturation in the main chain.

EXAMPLE 3

One thousand grams of a vacuum dried copolymer containing 30 weight percent styrene and 70 weight percent butadiene, dissolved in toluene. The styrene butadiene copolymer is then raised to atmospheric pressure and 1 weight percent platinic sulfate based upon the weight of copolymer, is added along with 300 grams of trichlorosilane. The platinic sulfate is dissolved in acetone prior to its addition. The resultant reaction mixture is then heated at 35 degrees centigrade with reflux at atmospheric pressure for 15 hours. At the end of the reaction time the temperature is raised to 75 degrees centigrade and heating continued under 7 millimeters of pressure absolute until all nonreacted triclorosilane has been removed. The resultant product is a silane substituted butadiene, styrene copolymer.

EXAMPLE 4

Five hundred grams of a copolymer of butadiene and acrylonitrile containing 65 weight percent of butadiene, dissolved in acetone, is reacted at room temperature and atmospheric conditions in the presence of 0.8 weight percent of platinic chloride (previously dissolved in acetone), based upon the weight of copolymer, with 720 grams of trichlorosilane for 7 hours. At the end of this time the reaction mixture is vacuum stripped at 65 degrees centigrade and 7 millimeters pressure until all unreacted triiodosilane has been removed.

EXAMPLE 5

One hundred grams of the polymer product of Example 1 are reacted with 700 grams of trimethylorthoformate at room temperature and atmospheric pressure. The resultant product is the polymer of Example 1, with the chlorine groups replaced with methoxy groups.

EXAMPLE 6

One hundred grams of the polymer product of Example 2 are reacted with 1100 grams of triethylorthoformate at room temperature and atmospheric pressure. The resultant product is the polymer of Example 1, with ethoxy groups having been substituted for the chlorine atoms.

EXAMPLE 7

One hundred grams of the polymer product of Example 1 are reacted with 900 grams of tributylorthoformate at room temperature and atmospheric pressure. The resultant product is a derivative of the polymer of Example 1, with butoxy groups substituted for the chlorine atoms.

The polymers prepared in Examples 1 through 7 may be blended with secondary polymers, including homopolymers and copolymers having molecular weights of one thousand to thirty thousand of monomers such as styrene, butadiene, methacrylate, ethylene, propylene and also polyolefins and polyesters and isoprene, in a weight ratio of from 0.5 part of the polymers of the compositions of this invention per 9.5 parts of secondary polymer through 0.5 part of secondary polymer per 9.5 parts of polymeric compositions of this invention by weight. A variation of the reaction conditions in the above examples would be to dilute the butadiene polymer or copolymer dissolved in a suitable solvent with a secondary polymer such as polystyrene prior to the addition of trihalosilane.

EXAMPLE 8

One thousand grams of the polymer of Example 7 and 2000 grams of polystyrene having a molecular weight of 30,000, were blended together with mild agitation, resulting in a homogeneous composition of matter.

EXAMPLE 9

Two thousand grams of polypropylene having an average molecular weight of 5000, and 1000 grams of the polymer composition of Example 1 are blended together using mild agitation until a uniform homogeneous mixture is formed.

The polymeric compositions of this invention as well as mixtures of the polymeric compositions of this invention can be used in many ways. In particular they are excellent coupling agents for reinforcing or filler materials in reinforced polymeric structures. That is the compositions of this invention when coated upon a filler material enhance the final bonding between the polymer lattice and the reinforcing filler material in the resulting reinforced polymeric structure. Thus the polymeric materials of this invention are coated upon such reinforcing or filler materials as glass fibers, asbestos fibers, carbon particles, silicate particles, clay particles, silica, aluminum, aluminum oxide, and other similar fillers used in reinforcing or obtaining particular properties in filled polymers or reinforced polymer products.

The polymer compositions of this invention may also be mixed into secondary polymers such as those listed above in weight percents of from 0.01 to 5 weight percent based upon the total composition. These mixtures will enhance the binding of the secondary polymers to secondary surfaces.

Preferred secondary polymers and copolymers are those prepared from butadiene, styrene, ethylene and propylene.

A preferred use of this polymer is the coating of glass fibers for use in laminated products or in preparing the belted portion of tires. An example of the solution used for coating the reinforcing materials would contain an inert solvent such as toluene, xylene or benzene containing from 0.01 to 5.0 weight percent of the polymer compositions of this invention. Generally the weight of polymers composition to filler material will be from .001 to 5 weight percent of the filler material. In order for those skilled in the art to fully understand the use of this composition the following nonlimiting examples are provided:

EXAMPLE 10

One thousand milliliters of a 0.2 weight percent solution of the composition of Example 1 in xylene is placed in an applicating vessel. A mat of approximately 1000 grams of glass fibers is dipped through the solution making sure the glass fibers are completely wetted. The glass fibers are then placed on a drying rack at room temperature and allowed to remain there for five hours or until completely dried. During the drying process the chlorine groups on the silane portion of the composition of Example 1 are hydrolyzed and a reaction is obtained between the silane and the glass.

EXAMPLE 11

One thousand milliliters of a 0.2 weight percent solution in toluene of the composition of Example 8 is placed in an applicating vessel. A mas sof approximately 1000 grams of asbestos fibers is dipped through the solution making sure of complete wetting of the asbestos fibers. The asbestos fibers are then placed on a drying rack at room temperature and allowed to remain there for five hours or until completely dried.

EXAMPLE 12

One thousand milliliters of a 0.2 weight percent solution of the composition of Example 8 in xylene is placed in an applicating vessel. A mass of approximately 1000 grams of clay granules is contacted with the solution making sure of complete wetting of the clay granules. The clay granules are then placed on a drying rack at room temperature and allowed to remain there for five hours or until completely dried.

As previously mentioned the polymer compositions of this invention may be added to secondary polymers. An additional example of this is to add the polymer compositions to an ethylene-propylene rubber.

EXAMPLE 13

500 grams of the polymer of Example 5 is blended with 10,000 grams of an ethylene-propylene rubber polymer having a molecular weight in excess of 1 million. The blending is performed in a molten state.

Another important use of the polymer composition of this invention is as "primers." That is these polymer compositions may be coated upon metals, glass or ceramic surfaces and used to enhance an adhesive bond between surfaces. Thus if one were to be bonding an aluminum strut to a subsurface of a hard ceramic, one would coat the aluminum and the ceramic with the polymer composition of this invention using a solution similar to those described above and allow the polymer composition to bind to the metal surface. These "primed" surfaces can then be bound to each other using a conventional polymeric adhesive and achieve a better coupling. A coated metal such as a coated steel wire can also be more easily used as a reinforcing wire in an elastomeric lattice such as tire cord. In order to more fully disclose this application of the polymer composition of this invention the following nonlimiting examples are given.

Naturally the weight of the polymer composition used as "primers" will depend upon the area to be bonded, in relation to the total weight of the structure. Thus if a small shape such as a glass rod were to be bonded to another shape, then the weight of polymer composition of this invention in relation to the glass rod may be as much as 5 weight percent. On the other hand, if the structure were an airplane link of high strength steel, the weight of polymer composition to the wing structure would be small, that is .001 or less.

EXAMPLE 14

A 0.3 weight percent solution of the polymer composition of Example 7 in toluene is brushed on steel tire wire. The wetted tire wire is then allowed to dry one hour at room temperature at a relative humidity of 70 percent. The tire wire is then placed into proximity of vulcanizing rubber and a tire prepared useing the steel wire as a reinforced cord.

EXAMPLE 15

A 500 milliliter solution of 0.1 weight percent polymer composition of Example 3 in mesitylene is brushed on an aluminum strut and allowed to dry at room temperature and 70% relative humidity. The aluminum strut is then bound by a conventional adhesive to a steel wing cover surface for the preparation of a corrugated aircraft wing. The polymeric composition of this invention enhances the elastomeric binding of the aluminum strut to the remaining portion of the corrugated wing structure.

Having thus described the invention, we claim:

1. A polymeric composition of matter which is comprised of the groups characterized by the following three formulae:

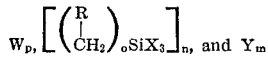

wherein W is the terminal group and is a hydrogen atom, a hydroxy radical, a carboxyl radical, an amine radical or an epoxy radical: R is the radical

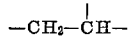

or said radical substituted wherein the substituents are a carboxy radical, a hydroxyl radical, an epoxy radical or an amine radical; X is a halogen atom of a molecular weight of less than 127, an acyloxy radical containing from 2 to 5 carbon atoms, or an alkoxy radical containing from 1 to 5 carbon atoms; Y is an alkylene radical containing from 2 to 10 carbon atoms, a divalent alkene radical containing from 2 to 10 carbon atoms, a phenylalkylene radical containing 8 to 14 carbon atoms, from an alkylphenylalkylene radical containing from 9 to 18 carbon atoms, a hydroxyphenylalkylene radical containing from 8 to 14 carbon atoms, a methoxyphenylalkylene radical containing from 9 to 15 carbon atoms, an ethoxyphenylalkylene radical containing from 10 to 16 carbon atoms, a hydroxyalkylphenylalkylene radical containing from 9 to 18 carbon atoms, a carboxyl, hydroxyl, an amine substituted alkylene radical, or a divalent radical represented by the formula —CH$_2$—CH$_2$—Z where Z is a carboxyl radical containing from 1 to 3 carbon atoms or a cyanide radical; $o$ is zero or an integer from 2 to 5, $p$ is an integer which is at least 2, $n$ is an integer equal to or greater than 1; $m$ is zero or an integer equal to or greater than 1 and $n$ and $m$ are chosen so that the average molecular weight is from about 500 to about 50,000, and at least 25 weight percent of the polymer is comprised of the group

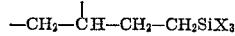

2. A composition of matter comprising from 5 to 95 weight percent of the composition of claim 1 and from 5 to 95 weight percent of a secondary polymer having molecular weight from about 500 to about 50,000 wherein said secondary polymer is a homopolymer or copolymer of butadiene, styrene, acrylate, acrylonitrile, propylene, or ethylene.

3. A composition of matter according to claim 1 wherein R is the radical

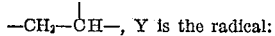

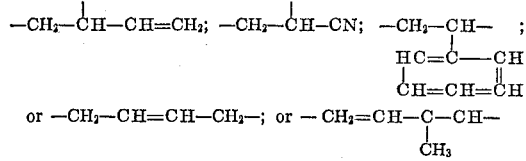

X is chlorine, methoxy or ethoxy, and $n$ and $m$ are chosen so that at least 25 weight percent of the polymer is the group

4. A polymer composition according to claim 1 wherein Y consisting essentially of the radical

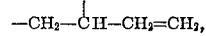

and at least 25 weight percent of the polymer is comprised of groups characterized by the following formula:

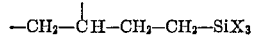

wherein X is a halogen atom with an atomic weight less than 127 an acyloxy radical of 2–5 carbon atoms or an alkoxy radical containing 1 to 3 carbon atoms.

5. A process for the preparation of silane modified polybutadienes which comprises reacting polybutadiene polymers having an average molecular weight of from about 300 to about 50,000 wherein the polybutadiene structure may be represented by the following formula

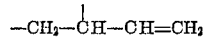

with a trihalosilane in an amount from one mole of trihalosilane per pendant vinyl group to one mole of trihalosilane per 100 pendant vinyl groups, in the presence of a catalytic amount of platinic halide.

6. A process according to claim 5 wherein said trihalosilane is trichlorosilane and said platinic halide catalyst is platinic chloride.

7. A composition of matter which comprises the polymer composition of claim 1 and inorganic fibrous or granular materials.

8. A composition of matter which comprises the polymer composition of claim 1 and inorganic fibrous or granular materials selected from the group consisting of glass, asbestos, clay, silicate, silica, aluminum, aluminum oxide, calcium carbonate, iron, steel, copper, brass, boron, and carbon in a weight ratio of from .01 part of said polymer composition of claim 1 per part of inorganic material to 5 parts of the polymer composition per part of inorganic materials.

9. A composition of matter which comprises a fibrous material selected from the group consisting of glass, asbestos, and steel fibers, coated with the composition of claim 4 in a weight ratio of from .001 to 5.0 parts of polymer composition to fibrous material.

10. A process of improving the bonding strength of inorganic materials in a polymer matrix which consists of coating said inorganic materials with the polymer composition of claim 1.

11. A process according to claim 9 wherein said inorganic material is selected from the group consisting of glass, silica, asbestos, clay, carbon, steel, silica, aluminum and aluminum oxide.

12. A process according to claim 10 wherein the weight percent of the polymer composition of claim 1, based upon inorganic material is from 0.01 to 5 weight percent.

13. A polymer composition which comprises from .01 to 5 weight percent of the polymer composition of claim 1, fibrous glass, and a homopolymer or copolymer prepared from the following monomers: butadiene, styrene, ethylene, and propylene.

References Cited

UNITED STATES PATENTS

| | | | |
|---|---|---|---|
| 3,503,943 | 3/1970 | Kresge et al. | 260—827 UX |
| 3,075,948 | 1/1963 | Santelli | 260—827 |
| 3,655,633 | 4/1972 | Saam | 260—827 UX |
| 3,505,279 | 4/1970 | Preston et al. | 260—827 X |

LEWIS T. JACOBS, Primary Examiner

U.S. Cl. X.R.

260—2 S, 37 N, 827